US009311759B2

(12) United States Patent
Shelley et al.

(10) Patent No.: US 9,311,759 B2
(45) Date of Patent: Apr. 12, 2016

(54) ROBUST SYSTEMS AND METHODS FOR IMPROVING PASSENGER JET AIRCRAFT FUEL ECONOMY

(71) Applicant: Alaska Airlines, Inc., Seattle, WA (US)

(72) Inventors: Shawn Shelley, Federal Way, WA (US); Kevin Collins, Seattle, WA (US); George A. Molnar, Auburn, WA (US); Steve Lovas, Kirkland, WA (US); Joseph E. Gockowski, III, Seattle, WA (US)

(73) Assignee: Alaska Airlines, Inc., Seattle, WA (US)

( * ) Notice: Subject to any disclaimer, the term of this patent is extended or adjusted under 35 U.S.C. 154(b) by 0 days.

(21) Appl. No.: 14/576,988

(22) Filed: Dec. 19, 2014

(65) Prior Publication Data

US 2015/0134187 A1 May 14, 2015

Related U.S. Application Data

(63) Continuation of application No. PCT/US2013/048673, filed on Jun. 28, 2013.

(60) Provisional application No. 61/665,842, filed on Jun. 28, 2012, provisional application No. 61/785,915, filed on Mar. 14, 2013.

(51) Int. Cl.
 *G06F 7/00* (2006.01)
 *G06F 11/30* (2006.01)
 (Continued)

(52) U.S. Cl.
 CPC .......... *G07C 5/008* (2013.01); *B64D 45/00* (2013.01); *G07C 5/006* (2013.01); *G07C 5/085* (2013.01); *B64D 2045/0085* (2013.01)

(58) Field of Classification Search
 USPC ........ 701/29.3, 104, 33.7, 33.9, 31.4, 3, 29.4; 415/17; 705/7.22–7.26; 702/183–184, 702/130, 132, 186; 340/945
 See application file for complete search history.

(56) References Cited

U.S. PATENT DOCUMENTS

| | | | | |
|---|---|---|---|---|
| 4,114,442 | A | * | 9/1978 | Pratt .............................. 374/113 |
| 6,122,575 | A | * | 9/2000 | Schmidt et al. ............... 701/31.8 |

(Continued)

FOREIGN PATENT DOCUMENTS

| | | | | |
|---|---|---|---|---|
| CA | 2857787 A1 | * | 1/2015 | .......... F05D 2220/50 |
| EP | 1767455 A2 | * | 3/2007 | ............. B64D 33/02 |

(Continued)

OTHER PUBLICATIONS

New Glid-ARc Plasmatron device for on-board plasma-assisted reforming of JP-8 fuels for auxiliary power units; Gallagher, M.J. ; Polevich, A. ; Rabinovich, A. ; Fridman, A; Plasma Science—Abstracts, 2009. ICOPS 2009. IEEE International Conference on DOI: 10.1109/PLASMA.2009.5227646; Publication Year: 2009 , p. 1.*

(Continued)

*Primary Examiner* — Cuong H Nguyen
(74) *Attorney, Agent, or Firm* — Klarquist Sparkman, LLP

(57) ABSTRACT

A method for improving fuel economy on a passenger jet aircraft comprises automatically receiving a communication from the aircraft to a ground station comprising at least one subsystem operating parameter measured during the current flight, detecting whether the operating parameter meets predetermined criteria and, if the criteria are met, automatically sending a communication to indicate the aircraft's status for a next flight. If the criteria are not met, a status of the aircraft is automatically changed and a communication is sent. Other methods and systems are also described.

17 Claims, 4 Drawing Sheets

(51) Int. Cl.
*G07C 5/00* (2006.01)
*G07C 5/08* (2006.01)
*B64D 45/00* (2006.01)

(56) References Cited

U.S. PATENT DOCUMENTS

| | | | | |
|---|---|---|---|---|
| 6,450,447 | B1 * | 9/2002 | Konrad et al. | 244/53 R |
| 6,697,718 | B2 * | 2/2004 | Le Draoullec et al. | 701/31.6 |
| 7,086,591 | B2 | 8/2006 | Anderson | |
| 7,469,545 | B2 * | 12/2008 | Riley | B64D 41/00 244/53 B |
| 7,487,029 | B2 * | 2/2009 | Feeney | F01D 19/00 415/17 |
| 7,979,193 | B2 * | 7/2011 | Harbert | 701/103 |
| 8,258,926 | B2 | 9/2012 | Bayer et al. | |
| 8,321,120 | B2 * | 11/2012 | Riley | F01D 21/12 60/778 |
| 8,594,903 | B2 * | 11/2013 | Feeney | F01D 19/00 123/299 |
| 2003/0167110 | A1 * | 9/2003 | Smith et al. | 701/3 |
| 2004/0195449 | A1 * | 10/2004 | Cordina et al. | 244/118.5 |
| 2005/0261820 | A1 * | 11/2005 | Feeney | F01D 19/00 701/100 |
| 2005/0273206 | A1 * | 12/2005 | McGinley | 700/291 |
| 2006/0071123 | A1 | 4/2006 | Nguyen et al. | |
| 2007/0000247 | A1 * | 1/2007 | Perkins | 60/565 |
| 2007/0051090 | A1 * | 3/2007 | Riley | 60/39.281 |
| 2007/0068169 | A1 * | 3/2007 | Riley | B64D 41/00 60/778 |
| 2009/0229272 | A1 * | 9/2009 | Feeney et al. | 60/778 |
| 2011/0125348 | A1 * | 5/2011 | Sandell et al. | 701/14 |
| 2012/0117974 | A1 * | 5/2012 | Hilgeman | F02C 6/06 60/772 |
| 2014/0130510 | A1 * | 5/2014 | Bouldin | F02C 7/14 60/782 |
| 2014/0142218 | A1 * | 5/2014 | Blohowiak | C09D 4/00 523/435 |
| 2015/0134187 | A1 * | 5/2015 | Shelley | B64D 45/00 701/29.3 |

FOREIGN PATENT DOCUMENTS

| | | | | |
|---|---|---|---|---|
| EP | 2829686 | A1 * | 1/2015 | F02C 7/26 |
| JP | 2008080934 | A * | 4/2008 | B64D 41/00 |
| JP | 2013103698 | A * | 5/2013 | B64D 47/00 |

OTHER PUBLICATIONS

Gas turbine APU reliability modeling and failure forecasting; Wang, Peng ; Wang, Shaonian ; Wang, Lulu; Reliability and Maintainability Symposium (RAMS), 2015 Annual; DOI: 10.1109/RAMS.2015.7105054; Publication Year: 2015 , pp. 1-5.*

Modeling and simulation of a coupled double-loop-cooling system for PEM-fuel cell stack cooling; Schultze, M. ; Kirsten, M. ; Helmker, S. ; Horn, J.; Control (CONTROL), 2012 UKACC International Conference on; DOI: 10.1109/CONTROL.2012.6334744 Publication Year: 2012 , pp. 857-863.*

PEM fuel cell system power control based on a feedback-linearization approach; Schultze, M. ; Horn, J.; Control & Automation (MED), 2012 20th Mediterranean Conference on; DOI: 10.1109/MED.2012.6265677; Publication Year: 2012 , pp. 439-444.*

Breakdown behavior of SF6 gas-insulated systems at low temperature: Frechette, M.F.; Roberge, D.; Larocque, R.Y.; Dielectrics and Electrical Insulation, IEEE Transactions on [see also Electrical Insulation, IEEE Transactions on] vol. 2, Issue 5, Oct. 1995 pp. 925-951; Digital Object Identifier 10.1109/94.469987.*

Experimental characterization of immersion-cooled devices at elevated ambient temperatures; Lenke, Robert U.; Christoph, Martin; De Doncker, Rik W.; Power Electronics Specialists Conference, 2008. PESC 2008. IEEE; Jun. 15-19, 2008 pp. 493-497; Digital Object Identifier 10.1109/PESC.2008.4591977.*

Fault diagnosis and isolation in aircraft gas turbine engines; Sarkar, S.; Mukherjee, K.; Ray, A.; Yasar, M.; American Control Conference, 2008; Digital Object Identifier: 10.1109/ACC.2008.4586813 Publication Year: 2008 , pp. 2166-2171.*

Estimation of multiple faults in aircraft gas-turbine engines; Sarkar, S.; Rao, C.; Ray, A.; American Control Conference, 2009. ACC '09. Digital Object Identifier: 10.1109/ACC.2009.5159981; Publication Year: 2009 , pp. 216-221.*

International Search Report and Written Opinion of the International Searching Authority, mailed Sep. 26, 2013, for corresponding International Application No. PCT/US2013/048673, 12 pages.

* cited by examiner

ROBUST SYSTEMS AND METHODS FOR IMPROVING PASSENGER JET AIRCRAFT FUEL ECONOMY

CROSS-REFERENCE TO RELATED APPLICATIONS

This application is a bypass continuation of International Patent Application No. PCT/US2013/048673, filed Jun. 28, 2013, which in turn claims the benefit of U.S. Provisional Application No. 61/665,842, filed Jun. 28, 2012, and U.S. Provisional Application No. 61/785,915, filed Mar. 14, 2013, all of which are herein incorporated by reference in their entirety.

FIELD

This application relates to passenger jet aircraft, and in particular, to systems and methods for improving the fuel economy and safety of such aircraft.

BACKGROUND

Improving the fuel economy and safety of passenger jet aircraft continues to be very important to operating competitively in today's crowded transportation marketplace. Reducing fuel consumption while maintaining the same or similar levels of service lowers operating costs, consumes fewer resources and, in some cases, may extend the capabilities of the aircraft.

In the case of non-redundant two-engine passenger jet aircraft, there is a class of long routes, referred to as "extended operations" (ETOPS) routes, that have conventionally required an auxiliary power unit to be run continuously ("Continuous Run"), in addition to the operation of both engines on 737 aircraft. An auxiliary power unit (APU) is a small gas turbine engine used to supply pneumatic power for various subsystems of the aircraft including starting the main turbine engines, as well as supplying electrical power. If the APU is on Continuous Run status (APUCR), the APU consumes fuel and wear and tear on the APU is increased, thus detracting from the overall efficiency of the aircraft. By contrast, if the APU is not run continuously, or is only run when needed, which is referred to as "On Demand" (APUOD) status, the APU consumes far less fuel and wear and tear is reduced, thus improving the overall economy of the aircraft.

It would be desirable to provide a robust approach for operating the APU only when required, such as to provide backup electrical in the event of a generator, or an engine failure.

SUMMARY

Described below are systems and methods for improving passenger jet aircraft fuel economy that address some of the shortcomings of the prior art.

According to a first implementation, a method for improving fuel economy on a passenger jet aircraft comprises automatically receiving a communication from the aircraft to a ground station comprising at least one subsystem operating parameter measured during the current flight, detecting whether the operating parameter meets predetermined criteria and, if the criteria are met, automatically sending a communication to indicate the aircraft's status for a next flight. If the criteria are not met, a status of the aircraft is automatically changed and a communication is sent.

The method can comprise automatically updating the system to reflect the status of the aircraft. The method can comprise coordinating completion of any maintenance on the subsystem to automatically trigger resumption of a programmed maintenance routine. The aircraft subsystem can be an auxiliary power unit, and the detected parameter can be the exhaust gas temperature value of the auxiliary power unit. The aircraft's status for a next flight can comprise one of operating an auxiliary power unit on an on demand status or operating the auxiliary power unit continuously.

The method can comprise detecting whether the operating parameter meets predetermined criteria, e.g., comprising determining whether the exhaust gas temperature value of the auxiliary power unit exceeds a threshold temperature. If the exhaust gas temperature value meets or exceeds a threshold temperature, then a communication can be initiated and the aircraft's status can be automatically updated in the system.

The threshold temperature can be a first threshold temperature, and a first alert can be communicated, and the method can further comprise detecting whether the exhaust gas temperature value meets or exceeds a second threshold temperature higher than the first threshold temperature. If the second threshold temperature is met or exceeded, then a second alert can be communicated.

According to a second implementation, a method for improving fuel economy on a passenger jet aircraft comprises receiving an exhaust gas temperature value for an axillary power unit on the aircraft, performing a comparison between the exhaust gas temperature value of the auxiliary power unit and at least one predetermined threshold temperature and determining, on the basis of the comparison, whether the auxiliary power unit must be operated continuously on the aircraft's next flight.

Performing the comparison can comprise determining whether the exhaust gas temperature value of the auxiliary power unit meets or exceeds 593° C. In addition, the comparison can comprising determining whether the exhaust gas temperature valve of the auxiliary power units meets or exceeds 604° C. Further, the comparison can comprise determining whether the exhaust gas temperature value of the auxiliary power unit meets or exceeds 632° C.

According to some implementations, performing a comparison comprises determining whether the exhaust gas temperature value of the auxiliary power unit is at least 593° C. and less than 604° C., and if so, sending a communication identifying the aircraft and the exhaust gas temperature value.

Performing a comparison can comprise determining whether the exhaust gas temperature value of the auxiliary power unit is at least 604° C. and not greater than 632° C., and if so then sending a communication to identify the aircraft and the exhaust gas temperature value and automatically updating the system to reflect the aircraft's status as requiring the auxiliary power unit to be operated continuously on a next extended operations flight unless corrective action is taken.

Performing a comparison can comprise determining whether the exhaust gas temperature value of the auxiliary power unit exceeds 632° C., and if so then sending a communication to identify the aircraft and the exhaust gas temperature value and automatically updating the system to reflect the aircraft's status as restricted from extended operations until corrective action is taken.

Detecting an exhaust gas temperature value of the auxiliary power unit can occur while the aircraft is in flight and undergoing a cold soak start test. If at least one of an in-flight auxiliary power unit start and a cold soak start test is unsuccessful, then a communication can be sent and the system can be updated. The method can comprise conducting a test to determine if the auxiliary power unit operates normally on the ground.

An aircraft maintenance verification system for a fleet of aircraft comprises a controller, a memory linked to the controller and having stored aircraft status information for each aircraft in the fleet and a display linked to the controller and the memory. The controller can be programmed to receive a predetermined subset of routine data transmitted from an aircraft in operation to a ground station, to send a normal operation communication indicating that the system is operating normally, and to update the display. If the normal operation communication is not received within a predetermined time period, an alert can be sent and the display can be updated. If the system is not returned to normal operation within a predetermined time interval, the system is updated to change the status of the aircraft. The subset of routine data received by the controller can include one or more parameters indicating the status of an auxiliary power unit. If the normal operation communication is not received, the system can be updated to require Continuous Run of the auxiliary power unit in each aircraft of the fleet.

According to another implementation, a method for coordinating maintenance requirements for a fleet of aircraft comprises scheduling at least a first aircraft of the fleet for a routine in-flight test on a first date to occur on a qualifying flight within a predetermined interval, automatically updating the system at least once to reflect the status of the aircraft as the end of the pre-determined interval approaches and, if the aircraft is later subjected to other maintenance requirements, automatically updating the routine in-flight test from the first date to occur on a second date and updating the system.

The foregoing and other objects, features, and advantages of the invention will become more apparent from the following detailed description, which proceeds with reference to the accompanying figures.

DETAILED DESCRIPTION

Figure 1:
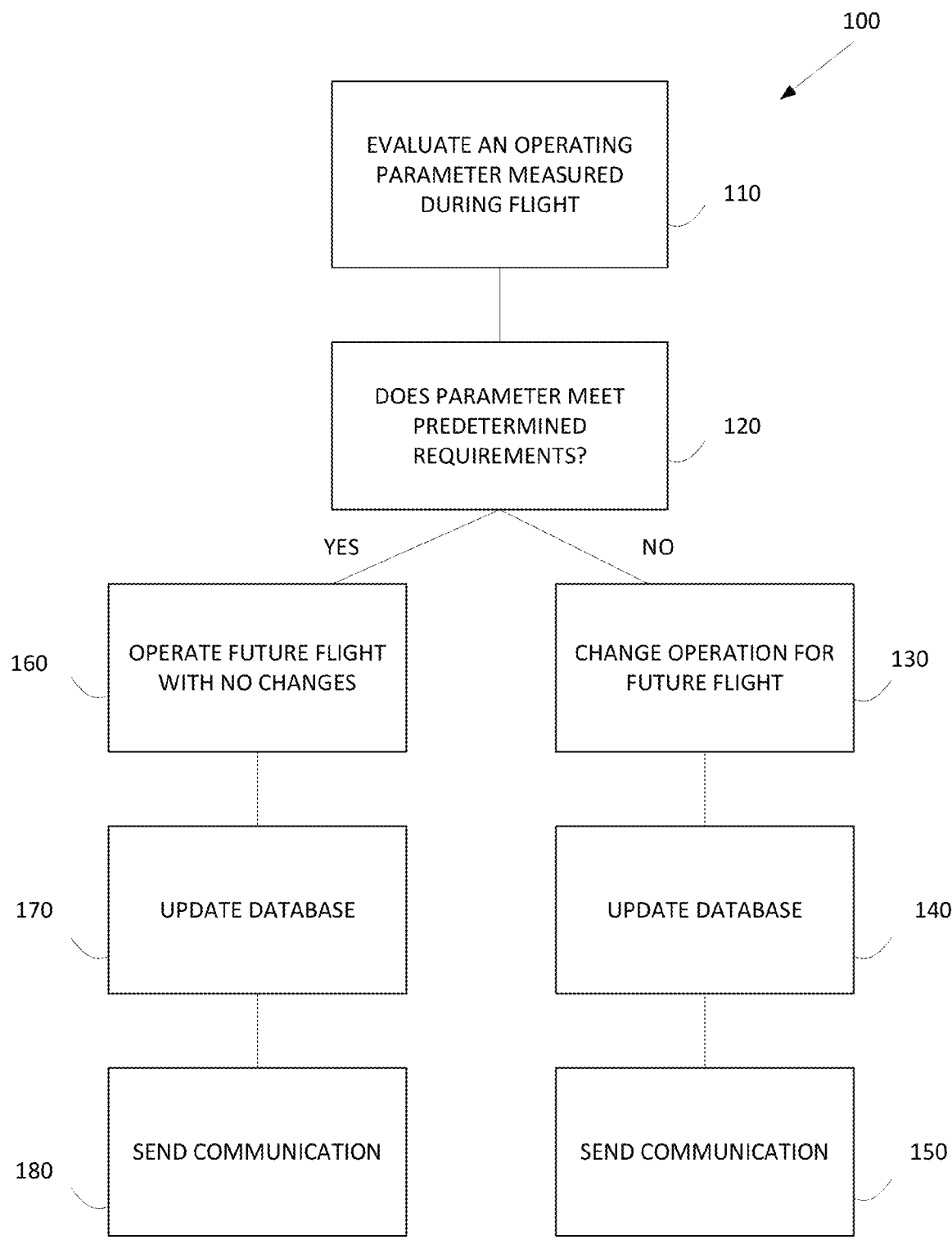
FIG. 1 is a flowchart of a first representative method for increasing aircraft fuel efficiency.

FIG. 1 is a flowchart of one implementation of a method for increasing the fuel efficiency of an aircraft. In step 110, at least one operating parameter of one of the aircraft's subsystems is measured during flight. Typically, the measured parameter is one of a set of parameters that are regularly transmitted from the aircraft to a ground station in routine communications. Optionally, it would be possible to obtain the operating parameter in other ways, such as by direct measurement on the aircraft.

In step 120, the parameter is evaluated to determine if it meets predetermined requirements. For example, the parameter may be a numerical value that is compared against a predetermined threshold.

If the parameter does not meet the predetermined requirements, then the status of the subsystem, e.g., the APUOD status and/or the aircraft is changed (step 130), typically by updating the system of aircraft and subsystem information (step 140), for instance by updating one or more databases. According to some implementations, the evaluation done on a current flight is effective for changing the status of the aircraft on a next or future flight.

In step 150, a communication is sent to one or more recipients. The content of the communication may include the operating parameter compared to one or more predetermined thresholds, an indication of the operating parameter requirement and/or an indication of the change in status for the aircraft and/or subsystem.

In step 160, if the operating parameter meets the predetermined requirements, the next flight is operated with no changes to the status of the aircraft and/or subsystem (i.e., no changes based on the operating parameter). In step 170, the system is updated accordingly, reflecting that the reliability testing has been completed and passed. In step 180, a communication of the relevant test information and status is sent to one or more recipients.

Figure 2:
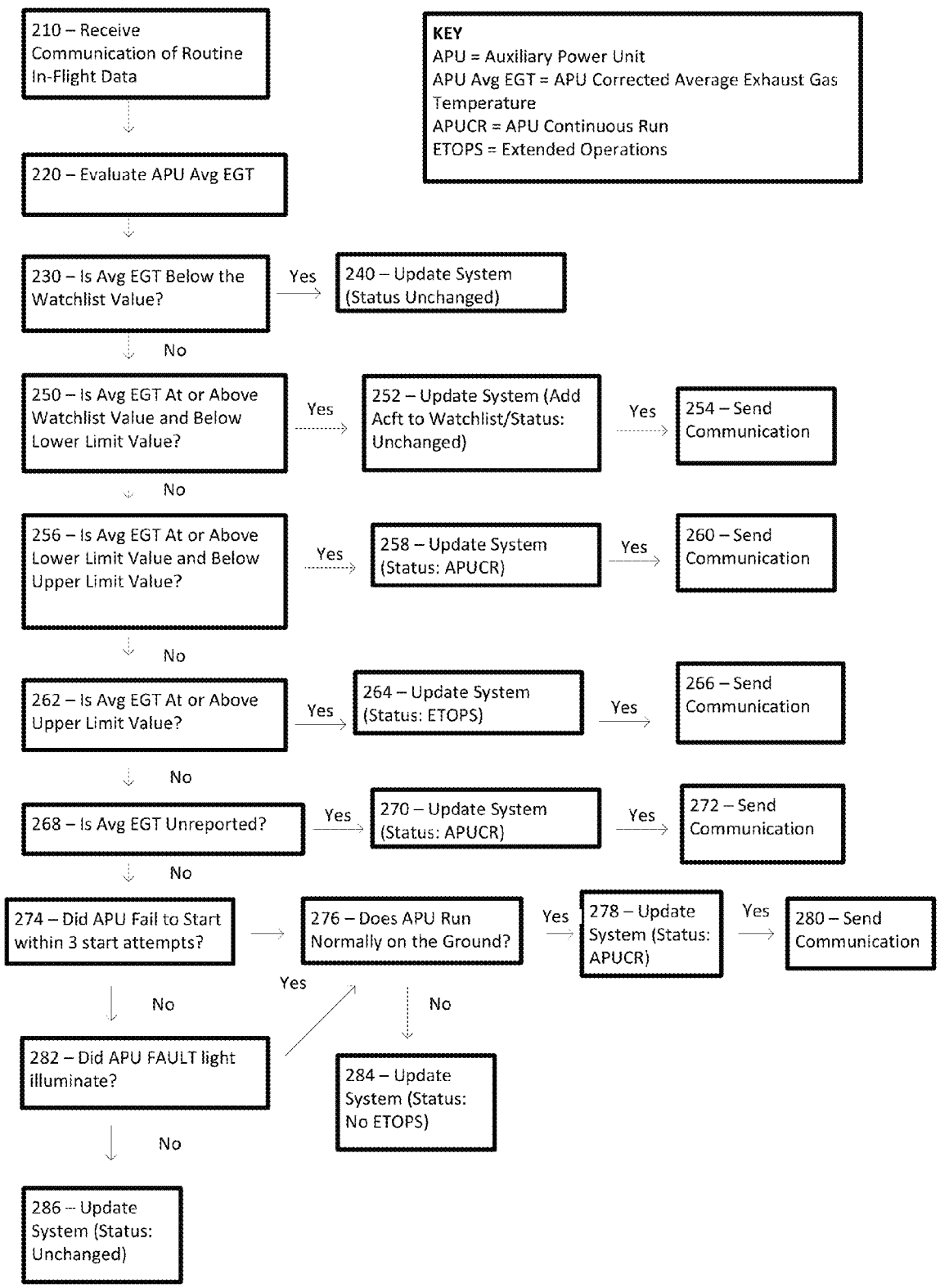
FIG. 2 is a flowchart of a second representative method for increasing aircraft fuel efficiency.

FIG. 2 is a flowchart showing a second implementation of a method for increasing the operating efficiency and safety of an aircraft. In step 210, a communication of routine in-flight data is received. In step 220, the condition or "health" of the APU is evaluated. Specifically, the condition of the APU can be correlated to its exhaust gas temperature taken at one or more times, one or more locations and/or subject to correcting factors. The systems and methods described herein extract one or more APU exhaust gas temperature values from the routine in-flight data.

In specific implementations, a "corrected average exhaust gas temperature" (Avg EGT) value is used. For example, the CT5ATP value can be used. Of course, it would be possible to use other values, such as other averages based on a different number of records or readings. For convenience as used herein, the term Avg EGT is defined to include a single temperature or an average of multiple temperatures (including the CT5ATP value), and also includes correcting factors.

If it is determined that the Avg EGT value is below a Watchlist Value (e.g., 593° C.) (step 230), the system is updated and the status of the APU and aircraft are unchanged (APUOD) (step 240).

If the Avg EGT value is at or above 593° C. and below a Lower Limit Value (e.g., 604° C.) (step 250), then the system is updated to reflect that the aircraft has been added to a watch list (step 252) and the APUOD status is unchanged. In step 254, one or more communications are sent, such as a communication to a Powerplant Engineer regarding the watchlisted status of the aircraft. Such communications can be sent by e-mail, text message, telephone, IT dashboard and/or other suitable formats. By adding the aircraft to the watch list, relevant personnel are reminded to pay it special attention with the possibility to take maintenance action with the goal of seeing that it is not required to be changed to APUCR.

In step 256, it is determined whether the APU Avg EGT value is at or above 604° C. and below an Upper Limit value (e.g., 632° C.). If so, then the system is updated (step 258) to reflect that the APU must be run continuously (APUCR) on ETOPS flights. In step 260, one or more communications are sent to recipients. For example, communications can be sent to an authority that controls and schedules aircraft maintenance and an authority that dispatches aircraft prior to flight.

In step 262, it is determined whether the APU Avg EGT value is at or above the Upper Limit Value (e.g., 632° C.). If so, the system is updated in step 264 to reflect that the aircraft does not qualify for ETOPS operation. In step 266, one or more communications are transmitted to various entities such as maintenance control, dispatch control and others to reflect the aircraft's change in status.

In step 268, it is determined whether the APU Avg EGT value was unreported in the routine in-flight data. If so, the system is updated in step 270 to reflect that no data was received, and one or more communications are sent in step 272.

In step 274, it is determined whether the APU failed to start within the OEM specifications (currently 3 start attempts). If so, an optional subtest 276 determines whether the APU runs normally while the aircraft is on the ground. If so, then the system is updated to reflect that the APU must be run continuously (APUCR) (step 278). In step 280, one or more communications are sent.

In step 282, it is determined whether the APU failed to start with the fault light illuminated. If so, an optional subtest 276 determines whether the APU runs normally while the aircraft is on the ground. If so, then the system is updated to reflect that the APU must be APUCR (step 278). In step 280, one or more communications are sent. In step 280, one or more communications are sent.

In step 276, it is determined if the APU does not start successfully on the ground. If it does not, the system is updated to reflect that the aircraft is no longer qualified for ETOPS (step 284).

In step 286, it is determined that the APU has successfully passed a cold soak start test. Accordingly, the system is updated to reflect the status of the APU and aircraft remain APUOD, i.e., the APU need only be operated on demand.

Figure 3:
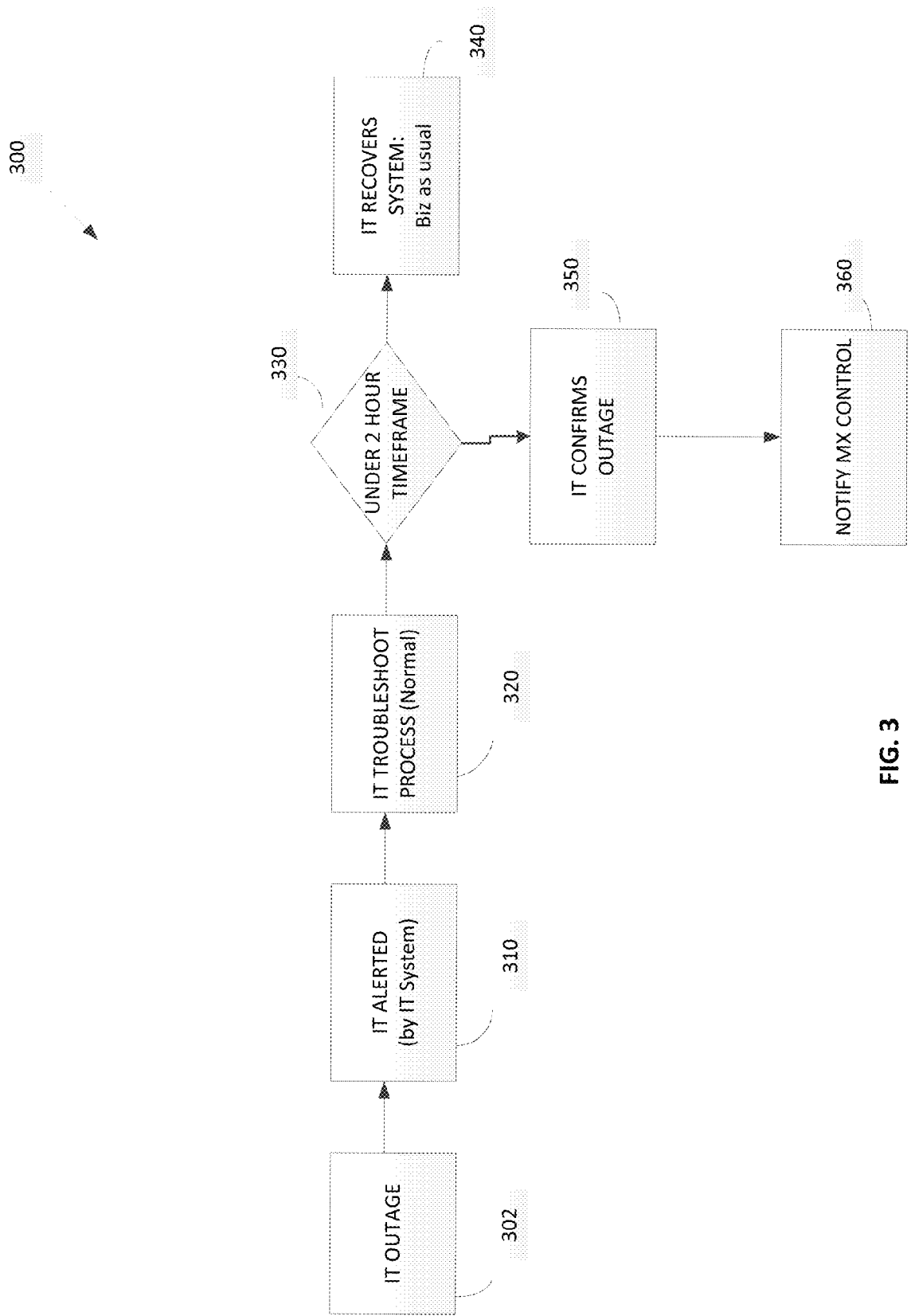
FIG. 3 is a schematic diagram of a system and method for verifying that the aircraft's communication link is operational.

In FIG. 3, one implementation of a system and method for verifying operation of the communication link by which data about an aircraft subsystem (e.g., the Avg EGT of the APU) is operational. In step 302, it is assumed that there has been an information technology (IT) outage. One such outage that would be monitored is whether the airline's link to the routine in-flight data communication from the aircraft to a ground station is properly receiving all communications.

In step 310, assuming there is an outage; the airline's relevant departments are alerted. In step 320, these departments begin troubleshooting the outage. In step 330, it is determined whether two hours have elapsed. If so, and if the outage has been restored, then operation continues normally (step 340).

If not, however, then IT confirms the outage (step 350), and maintenance control is notified (step 360) and the monitoring of the situation continues. In addition, after an outage of at least three hours, the system is updated and communications are sent. Specifically, if a data outage cannot be resolved within a predetermined timeframe, then the status of all affected aircraft is changed to require that the APU be APUCR. This is a conservative course of action to address the possibility that an aircraft may be required to change to APUCR for any parameters that dictate a status change as stated above due to loss of communication.

Figure 4:
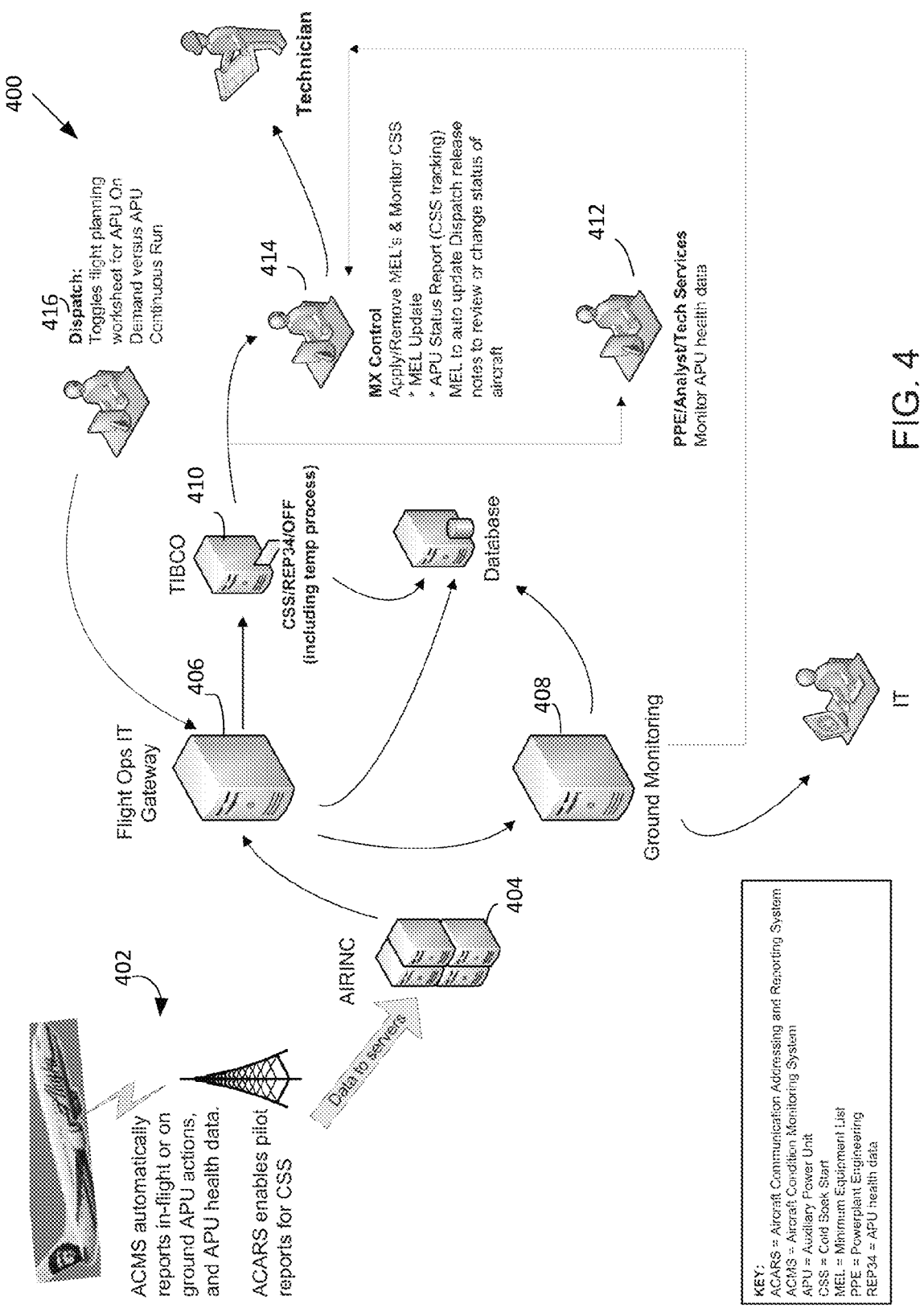
FIG. 4 is an overall process flow diagram for operation of the aircraft's auxiliary power unit.

FIG. 4 is an overall process flow diagram for the APUOD systems 400 and methods. As indicated at the left hand side of the figure, the Aircraft Condition Monitoring System (ACMS)/Aircraft Communication Addressing and Reporting System (ACARS) system 402 reports in-flight or on ground APU actions, APU health data (including the APU Avg EGT values and information on APU starts) and pilot reports of cold soak start testing for an aircraft. This information may be received by an entity other than the airline operating the aircraft, such as is represented by the AIRINC server bank 404 in FIG. 4. Subsequently, this information flows to the airline's computer systems, such as through one or more servers identified in FIG. 4 as the airline's Flight Operations IT servers 406. As described, the airline's computer systems are programmed with specific instructions to receive the information, evaluate the information, cue actions to be taken, update the status of the aircraft and send communications.

Specifically, the APU health data is used in processes implemented on the IT servers 406, the Ground Monitoring server 408 and the TIBCO servers 410. For example, a controller is programmed to compare the Avg EGT data to predetermined requirements. If the APU Avg EGT value is at or above 593° C., then the aircraft is watch-listed in the system, and one or more communications are sent to a Powerplant Engineering (PPE) function 412. This function can then monitor the performance of the aircraft even more closely. The status of the aircraft remains unchanged.

If the Avg EGT value of the APU is at or above 604° C. and below 632° C., then an urgent communication is sent to a Maintenance Control (MX Control) function 414 and the PPE function 412. The status of the aircraft is updated to APUCR to indicate that the aircraft's APU must be operated continuously until it undergoes another status change.

Communications can be sent via IT dashboards, pop-up screens, text messaging, telephone, and other communication links, such as other broadcast communication techniques, where appropriate. Some communications are directed to one or more individual recipients, whereas other classes of communications are broadcast to all members of a particular class (e.g., all MX Control screens).

The Ground Monitoring function includes software implemented to function as a reliability health monitor to ensure that data from the aircraft is properly received through the servers at regular intervals. This provides confidence that the computer systems are functioning properly.

The dispatch function uses dispatch release software to generate ETOPS flight plans. The Dispatcher determines through communication the status of the aircraft (APUOD or APUCR) and inputs the status to the Flight Planning Worksheet software. This software automatically determines fuel load depending on whether the APU will be operated APUOD or APUCR. The Flight Plan will be generated automatically with clear designation as to the status of the aircraft for Flight Crew verification.

The system automatically tracks the completion of successful cold soak start testing whether accomplished based upon a required repetitive interval or post-maintenance requirements. The system takes into account whether: the aircraft is scheduled on a qualifying flight segment ensuring adequate cold soak start test requirements, the segment is ETOPS or non-ETOPS, the aircraft has adequate turn time, and the flight terminates at a maintenance facility. If the aircraft status has been changed to APUCR, the system prohibits a cold soak start test on an ETOPS flight segment and a notification will not be sent to the Flight Crew to conduct the test.

One implementation includes the ACARS report screen selection for the Flight Crew to select and transmit results of cold soak start tests. The Flight Crew includes the number and altitude of APU start attempts conducted. Another implementation is an enhanced APU health report not requiring Flight Crew reporting. The system will also retrieve APU rotor speed of greater than 90% to determine successful shutdown versus auto-shutdown and the altitude at which the start attempts were conducted. Once the data is retrieved that the cold soak start test was conducted, the system will validate that the APU start was conducted within cold soak start test parameters. If the cold soak start test is successful, a communication is sent out to MX Control and the APUOD eligibility is also renewed. If the cold soak start testing was found to be invalid, the system converts the data to an APU start and the APUOD eligibility will not be renewed. In the case of either a valid or invalid cold soak start test failing, MX Control will be notified through an electronic communication.

The possible embodiments include those implementations where the system monitors the condition, or "health" of the APU as correlated to any of the APU operating performance indicators. The possible embodiments include those implementations for use on those aircraft without electrical back-up requiring an APU, as well as aircraft with electrical back-up where the APU is not required for ETOPS operations.

The described process makes use of a three-level tiered response (i.e., akin to a green light, yellow light, red light approach), but it would of course be possible to implement the system using two levels or four levels. Indeed, in other implementations, instead of the described single intermediate level for watch-listed status, there may be multiple intermediate levels. Any specific numerical values detailed above, including temperature levels, can be dynamic and may be changed to meet program requirements, and should not be taken as limiting in scope.

In view of the many possible embodiments to which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

We claim:

1. A method for improving fuel economy on a passenger jet aircraft implemented on one or more processors of one or more networked computers, comprising:
   receiving a communication at a networked computer comprising at least an exhaust gas temperature value for an auxiliary power unit measured while the auxiliary power unit is operating during a current flight of the aircraft and previously communicated via an aircraft to ground station communications link transmission;
   automatically detecting, using a networked computer, whether the exhaust gas temperature value exceeds at least one threshold temperature;
   wherein, if the exhaust gas temperature does not exceed at least one threshold temperature, then using a networked computer to automatically set the aircraft's future flight status to operating the auxiliary power unit on demand and to automatically send a communication to indicate the aircraft's future flight status, and
   wherein, if the exhaust gas temperature exceeds at least one threshold temperature, then using a networked computer to automatically set the aircraft's future flight status to operating the auxiliary power unit continuously and to automatically send a communication to indicate the aircraft's future flight status; and
   automatically updating a database, using a networked computer, to reflect the aircraft's future flight status.

2. The method of claim 1, further comprising coordinating completion of any maintenance on the auxiliary power unit to automatically trigger resumption of a programmed maintenance routine.

3. The method of claim 1, further comprising accounting for the aircraft's future flight status in calculations of a fuel load required for the future flight.

4. The method of claim 1, wherein the at least one threshold temperature is a first threshold temperature and the communication is a first alert, and further comprising detecting whether the exhaust gas temperature value meets or exceeds a second threshold temperature higher than the first threshold temperature, wherein if the second temperature threshold is met or exceeded, then a second alert is communicated.

5. The method of claim 1, wherein if the exhaust gas temperature value exceeds a first threshold temperature but does not exceed a second threshold temperature, automatically setting the aircraft's future flight status to a watch-listed status, and sending a communication regarding the aircraft's watch-listed status to at least a power plant engineer responsible for the aircraft.

6. The method of claim 1, wherein if the exhaust gas temperature value does not exceed at least one threshold temperature, then updating a database to indicate that the aircraft's status is unchanged.

7. The method of claim 1, further comprising monitoring the communications link between the aircraft and the ground station to determine if a communications outage has occurred, and wherein if no exhaust gas temperature value is received after a predetermined time period has elapsed, then changing the aircraft's status for the next flight to operating the auxiliary power unit continuously.

8. The method of claim 1, wherein receiving a communication comprises receiving a communication specifying that the auxiliary power unit failed to start during the current flight, further comprising determining whether the auxiliary power unit operates when the aircraft is on the ground, and, if so, updating the aircraft's status for the next flight to operating the auxiliary power unit continuously.

9. The method of claim 1, further comprising determining if the aircraft to ground station communications link is exhibiting an outage, and if so, initiating a troubleshooting operation to troubleshoot the communications link.

10. The method of claim 9, wherein if any outage in the communications link lasts longer than a predetermined time, then seeking confirmation of the outage, and wherein if the outage is confirmed, then updating the status of the aircraft and other affected aircraft that use the same communications link to a no extended flight status.

11. The method of claim 1, wherein the exhaust gas temperature value is measured while the aircraft is undergoing a cold soak start test.

12. The method of claim 11, wherein if at least one of an in-flight auxiliary power unit start or the cold soak start test is unsuccessful, then a communication is sent and the system is updated.

13. The method of claim 1, further comprising conducting a test to determine if the auxiliary power unit operates normally on the ground.

14. A computer-implemented aircraft maintenance management system for a fleet of aircraft, comprising:
   one or more processors associated with a plurality of networked computers;
   memory linked to the one or more processors, at least one memory location having stored aircraft status information for multiple extended operations aircraft; and
   at least one display linked to at least one of the controllers processors and at least one of the memory elements;
   wherein the memory has stored instructions to cause the one or more processors to receive a predetermined subset of routine data transmitted via a communications link from an aircraft in current operation to a ground station, to control setting an extended flight eligibility status for a future flight of the aircraft in current operation based on comparing a current exhaust gas temperature value of the aircraft's auxiliary power unit as received in the routine data to predetermined criteria, to control sending communications to multiple recipients, to update records stored in the memory elements, and to display messages regarding at least the status of the aircraft in operation, the status of other aircraft in the fleet or the status of the communications link.

15. The system of claim 14, wherein, for the aircraft in current operation, the controller sets the status of the aircraft for a future extended operations flight to allowing operation of an auxiliary power unit on an on demand basis or requiring operation of the auxiliary power unit continuously.

16. The system of claim 14, wherein if the exhaust gas temperature value exceeds a first threshold temperature but does not exceed a second threshold temperature, the controller automatically sets the aircraft's status to a watch-listed status, and sends a communication regarding the aircraft's watch-listed status to at least a power plant engineer responsible for the aircraft.

17. The system of claim 14, wherein the controller determines if communications link is exhibiting an outage, and if so, initiates a troubleshooting operation to troubleshoot the communications link.

* * * * *